Sept. 10, 1940.  H. L. WHITE ET AL  2,214,004
NONDRIP MILK BOTTLE
Filed Jan. 27, 1940

INVENTORS
Harry L. White and
BY  John Arthur Keenan
H L Kirkpatrick  their
ATTORNEY Patented Sept. 10, 1940

2,214,004

UNITED STATES PATENT OFFICE 2,214,004

NONDRIP MILK BOTTLE

Harry L. White, Melrose, and John Arthur Keenan, Newton, Mass., assignors to General Ice Cream Corporation, Schenectady, N. Y., a corporation of New York Application January 27, 1940, Serial No. 316,014

8 Claims. (Cl. 215—31)

This invention relates to an improved glass milk bottle and has for its object to provide a more sanitary, durable and convenient glass milk container than has heretofore been available, and specifically a bottle which substantially eliminates dripping and milk passing down and along the outside surface of the bottle as the result of pouring milk from the bottle.

For some years prior to the advent of this invention, a great deal of time and effort have been spent in attempts towards improving the head finish of milk bottles used for dispensing milk for ordinary consumption, particularly to provide a nondripping and sanitary bottle, and the subject has engaged not only the attention of milk sanitarians, public health officials, and the like, but also the research organizations of various bottle, cap, and milk companies. Various sorts of pouring lips and closures have resulted, but none of them, in the light of our long experience in the milk industry, provides the very substantial advantages from the standpoint of sanitation and durability afforded by the novel nondrip bottle of this invention.

The provision of a satisfactory bottle involves not only a sanitary nondrip bottle (including an adequate capping means) but also a durable bottle which can withstand the repeated machine washing, filling, and the wear and tear incident to normal delivery, washing, and use of a bottle in connection with dispensing milk therefrom and without adversely affecting its nondripping characteristics. Our bottle achieves these results and has proved in practice to be wholly satisfactory.

Figures 1, 2:
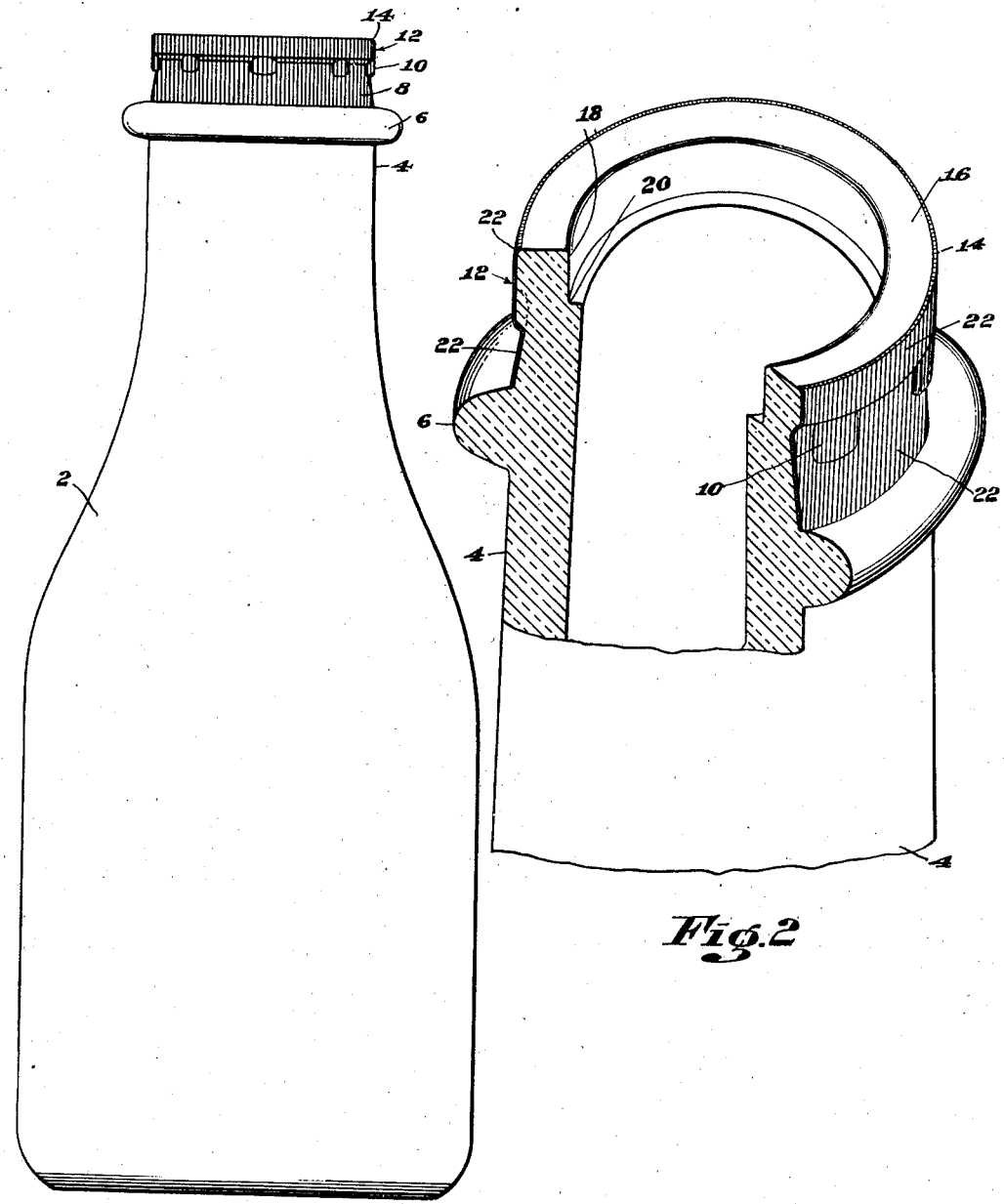
Figure 1 is an elevational view, illustrating the bottle of this invention.
Fig. 2 is an enlarged vertical sectional view illustrating the neck and head finish of our bottle.

Referring to the drawing in which like numerals represent like parts, the glass bottle of this invention, in its preferred form there shown, as employed in the commercial embodiment of the invention, includes a body portion 2 and neck 4, near the top of which is a bumper roll 6 surmounted by a pouring lip consisting of a frustoconical portion 8 (though it may be cylindrical or otherwise formed) having near the top thereof a series of lugs 10 and shoulder 12 extending slightly outward from the upper part of the frusto-conical portion between the lugs 10. This shoulder generally designated 12 presents a substantially vertical surface terminating in a relatively sharp corner 14 provided with a relatively small radius (for example 1/32" or thereabouts) connecting the substantially vertical surface of the shoulder to the substantially flat surfaced rim 16 at the top of the bottle, said flat rim surface at its inward edge connecting with the inner surface 18, which surface may or may not include a cap seat 20. Ordinarily a cap covers the bottle down to or below the bottom of the shoulder 12, or even below the lugs 10. Covering the portion 8, lugs 10, and shoulder 12, on the outside of the vertical surface of the latter but not covering the angularly related flat surfaced rim 16, is an opaque, pigmented ceramic glaze or coating 22 (as hereinafter more fully described) which is intimately bonded to and with the glass of the bottle and, in effect, forms a part thereof. In our preferred nondrip bottle, the combined effect of the shape of the bottle (substantially flat and, for the most part at least, uncoated rim, relatively sharp, small-radius corner, and substantially vertical coated surface) plus the coating, including particularly the nature and localized character of the latter, provides a drip barrier and the desired novel nondripping result of the bottle of our invention, a striking and unique result not attained by prior art milk bottle in that normally, and in practically all cases, with our bottle, during and after pouring, the film breaks cleanly at the corner where the coating preferably begins, without dripping or passing down and along the outside surface, (usually contaminated below the cap coverage) to the body of the bottle—thus minimizing or avoiding such contamination. As may be established by recognized standard pour tests, both in initiating and during pouring, the milk smoothly issues over the rim of the bottle and diverges from the outside face of the shoulder without material (if, indeed, any) contact with the subjacent portion of the bottle, and, after pouring, if any milk in contact with the bottle passes below the corner 14 it is of no importance since the amount rarely exceeds a drop or so, and any such trifling bit of milk never goes far either because of the bumper roll or (even in the absence of the bumper roll) because it becomes exhausted by wetting the uncoated surface of the glass. In addition to cooperating in the nondrip functioning of our bottle, the coating also serves to minimize capillary flow between the coating and a cap contacting the same, including either outward flow of the contained milk, or inward flow of contaminating liquids, such, for example, as rain or other water.

The manufacture of the bottle of our invention is conducted in accordance with well known bottle manufacturing practices so as to provide a clear or transparent glass bottle of the desired size and form though with the shoulder shaped substantially as shown in the drawing hereof, such manufacture preferably being accomplished by molding the bottle in present day bottle molding machinery, as well known and understood in the art. Following such manufacture of the bottle, there is applied thereto an opaque coating 22 made up of a pigmented flux or frit, which is colored by said pigment so as to provide, for example, a coating of black, white, or any one of various colors or mixtures thereof, said coating being substantially non-wettable to milk and providing with the shoulder thereof the drip cut-off of this invention. In accordance with our preferred practice, the coating is manufactured by melting 25% sand and 75% lead in a small furnace and allowing the molten material to run into cold water which cools and cracks the glass into a fine angular flux material. This flux is then removed from the water, is ground, and upon being dried is ready to have the coloring pigments added thereto. The coloring pigments are made up of various sulphites, sulphides and/or oxides, such as uranium or cadmium sulphite to make yellow; selenium and cadmium sulphide for red; chrome oxide for green; cobalt, chrome, manganese oxide and iron oxide for black; cobalt for blue; and for all yellow-orange or red-orange shades a small amount of selenium in combination with cadmium sulphide base; while maroon is a small amount of cadmium sulphide with an overcharge of selenium. These pigments are mixed together and calcined to a point just below their fusion temperature and are then thoroughly ground to get a uniform mixture of the coloring pigment. To the frit or flux is now added 5 to 20% by weight of the coloring pigment and the material is then placed in a ball mill and thoroughly ground to pass a fine mesh screen. Following the screening and drying, the completed pigmented flux is then mixed with a small amount of suitable liquid carrier, stencilled or otherwise applied to the bottle in a substantially uniform layer to provide a coating located as hereinbefore set forth, and the bottle then heated to a temperature sufficient to bond the coating to the glass, say to a red heat of 1000–1200° F., thus permanently affixing and bonding the coating to the shoulder and immediately subjacent portion of the neck of the bottle, thereby providing a hard, substantially permanent and insoluble coating able to resist ordinary abrasion, shocks and handling due to normal use, and to withstand normal washing practice including hot water, soaps, caustics, etc., incident to required repeated washings for the usual life of a bottle. Though, in our experience, it is found that the pigmented coatings vary somewhat in their nondrip effectiveness, in the order of red, orange and yellow, green, blue, black, and white, it is found, in practice, that all of the coating materials above set forth are adequate for the purpose of providing in conjunction with the bottle thus shaped the effective, practical nondrip bottle of this invention.

In this specification and appended claims, for convenience the word "colored" is to be taken as including not only what are strictly and technically colored coatings, but in addition, also block and white, or mixtures thereof. Also, for convenience herein we use the terms "nondrip" or "nondripping" as meaning not only what common usage thereof would imply but also as including the minimizing or "cut-off" of milk passing down and along the outside surface of the bottle during and after pouring.

Having described our invention, what we wish to claim by Letters Patent is:

1. A nondrip milk bottle made of transparent clear glass having in combination a body portion, a neck near the upper end of said body portion, a pouring lip extending thereabove, said pouring lip having a substantially flat upper surface of said glass and a substantially vertical-sided shoulder portion connected therewith by a relatively small radius, and an opaque ceramic pigmented colored glaze fused to the pouring lip beginning at and extending downwardly from the peripheral edge of said flat portion and covering the vertical surface of said shoulder portion.

2. A nondrip milk bottle made of transparent clear glass having in combination a body portion, a neck near the upper end of said body portion, a pouring lip extending thereabove, said pouring lip having a substantially flat upper surface of said glass and a substantially vertical-sided shoulder portion connected therewith by a relatively small radius, and an opaque ceramic colored glaze fused to the pouring lip and extending downwardly from the peripheral edge of said flat portion and covering the entire vertical surface of said shoulder portion.

3. A nondrip milk bottle made of transparent clear glass having in combination a body portion, a neck near the upper end thereof, a pouring lip extending thereabove, said pouring lip having a substantially flat upper surface of said glass and a substantially vertical-sided shoulder portion connected therewith by a relatively small radius, a series of lugs extending downwardly from the shoulder portion and a section connecting the shoulder portion and said neck, and an opaque ceramic pigmented colored glaze fused to the pouring lip beginning at and extending downwardly from the peripheral edge of said flat portion and covering the said vertical surface and lugs.

4. A nondrip milk bottle made of transparent clear glass having in combination a body portion, a neck near the upper end of said body portion, a pouring lip extending thereabove, said pouring lip having a substantially flat upper surface of said glass and a substantially vertical-sided shoulder portion connected therewith by a relatively small radius, and an opaque ceramic colored glaze consisting mainly of silica and lead fused to the pouring lip and extending downwardly from the peripheral edge of said flat portion and covering the entire vertical surface of said shoulder portion.

5. A nondrip milk bottle made of transparent clear glass having in combination a body portion, a neck near the upper end thereof, a pouring lip extending thereabove, said pouring lip having a substantially flat upper surface of said glass and a substantially vertical-sided shoulder portion connected therewith by a relatively small radius, a series of lugs extending downwardly from the shoulder portion and a section connecting the shoulder portion and said neck, and an opaque ceramic pigmented colored glaze consisting mainly of silica and lead fused to the pouring lip beginning at and extending downwardly from the peripheral edge of said flat portion and covering the said vertical surface and lugs.

6. A nondrip milk bottle made of transparent clear glass having in combination a body portion, a neck near the upper end thereof, a pouring lip extending thereabove, said pouring lip having a substantially flat upper surface of said glass and a substantially vertical-sided shoulder portion connected therewith by a relatively small radius, a series of lugs extending downwardly from the shoulder portion and a frusto-conical section connecting the shoulder portion and said neck, and an opaque ceramic pigmented colored glaze fused to the pouring lip beginning at and extending downwardly from the peripheral edge of said flat portion and covering the said vertical surface, lugs, and frusto-conical section.

7. A nondrip milk bottle made of transparent clear glass having in combination a body portion, a neck with a bumper roll near the upper end thereof, a pouring lip extending thereabove, said pouring lip having a substantially flat upper surface of said glass and a substantially vertical-sided shoulder portion angularly related to said flat upper surface by a relatively small radius, a section of smaller diameter than said shoulder portion connecting the shoulder portion and said bumper roll, and an opaque ceramic pigmented colored glaze fused to the pouring lip beginning at and extending downwardly from the peripheral edge of said flat portion and covering the vertical surface.

8. A nondrip milk bottle made of transparent clear glass having in combination a body portion, a neck with a bumper roll near the upper end thereof, a pouring lip extending thereabove, said pouring lip having a substantially flat upper surface of said glass and a substantially vertical-sided shoulder portion angularly related to said flat upper surface by a relatively small radius, a section of smaller diameter than said shoulder portion connecting the shoulder portion and said bumper roll, and an opaque ceramic pigmented colored glaze consisting mainly of silica and lead fused to the pouring lip beginning at and extending downwardly from the peripheral edge of said flat portion and covering the vertical surface.

HARRY L. WHITE.
JOHN ARTHUR KEENAN.